United States Patent [19]
Ogawa et al.

[11] Patent Number: 6,038,950
[45] Date of Patent: Mar. 21, 2000

[54] METHOD FOR CUTTING TUBE

[75] Inventors: Yuji Ogawa, Handa; Yasuo Abe, Kariya; Tamotsu Inoue, Nagoya, all of Japan

[73] Assignee: Denso Corporation, Kariya, Japan

[21] Appl. No.: 08/963,495

[22] Filed: Nov. 3, 1997

[30] Foreign Application Priority Data

Nov. 8, 1996 [JP] Japan .................................. 8-296877

[51] Int. Cl.⁷ ...................................................... B26D 1/28
[52] U.S. Cl. ................................................. 83/54; 83/337
[58] Field of Search ............................... 83/37, 54, 337, 83/636

[56] References Cited

U.S. PATENT DOCUMENTS 5,407,116  4/1995  Nishishita et al. .
5,495,972  3/1996  Nishishita et al. .

*Primary Examiner*—Kenneth E. Peterson
*Attorney, Agent, or Firm*—Harness, Dickey & Pierce, PLC

[57] ABSTRACT

A cutting device cuts a flat tube in such a manner that a locus connecting each point where a blade tip of a blade portion of the cutting device is firstly introduced into the flat tube passes through a base portion of a frontmost side protrusion portion. Therefore, the bending moment generated due to a cutting force of the cutting device is decreased to prevent defective cutting.

3 Claims, 3 Drawing Sheets

METHOD FOR CUTTING TUBE

CROSS-REFERENCE TO RELATED APPLICATION

This application is related to and claims priority from Japanese Patent Application No. Hei. 8-296877, filed on Nov. 8, 1996, the contents of which are hereby incorporated by reference.

BACKGROUND OF THE INVENTION

1. Field of the Invention

The present invention relates to a method for cutting a flat tube formed by folding a plate, for example.

2. Description of Related Art

Conventionally, a sawing cutting method using a metal sawing machine and a shearing cutting method using a shearing machine are well-known for cutting a flat tube. The inventors of the present invention made a flat tube (see FIG. 1) by folding a plate, and cut the flat tube in accordance with the conventional sawing cutting method or shearing cutting method. As a result, a protrusion portion (i.e., a folded end portion of the plate) 11c of the flat tube 1 is deformed in a cutting direction of a blade portion of the cutting device used to cut the tube, as shown in FIG. 6. In FIG. 6, a locus $L_0$ is obtained by connecting each point where a blade tip of a blade portion of the cutting device is firstly introduced into the flat tube 1 in a cutting direction. In the conventional method, since the locus $L_0$ is parallel with the cutting direction of the flat tube 1, a cutting force F of the cutting device is applied to the protrusion portions 11a–11c at each center portion corresponding to the locus $L_0$.

In the flat tube 1, because the protrusion portion 11c in FIG. 6 is supported only at a base portion 11e thereof, the protrusion portion 11c is readily deformed in the cutting direction so that defective cutting is caused when the flat tube is cut according to the conventional method.

SUMMARY OF THE INVENTION

In view of the foregoing problems, it is an object of the present invention to provide a method for precisely cutting a flat tube using a cutting device while preventing a defective cutting.

According to the present invention, the above object is achieved by providing a cutting device which includes a blade portion having a blade tip for cutting a tube with a cutting force in a cutting direction and a controlling unit for controlling the blade tip of the blade portion in such a manner that a locus connecting each point where the blade tip is firstly introduced into the tube in the cutting direction passes through an overlapped portion of the tube at a position where bending rigidity due to the cutting force is increased. Therefore, a part of plate forming the overlapped portion is hardly deformed by the cutting force so that defective cutting can be prevented.

Further, the locus passes through a position proximate to a base portion of a protrusion portion at the frontmost side in the cutting direction. Therefore, a bending moment applied to the protrusion portion becomes small, and the protrusion portion is hardly bent and deformed. Thus, the tube is precisely cut while preventing defective cutting.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention are described hereinafter with reference to the accompanying drawings.

A first preferred embodiment of the present invention will be described with reference to FIGS. 1 and 2.

Figure 1:
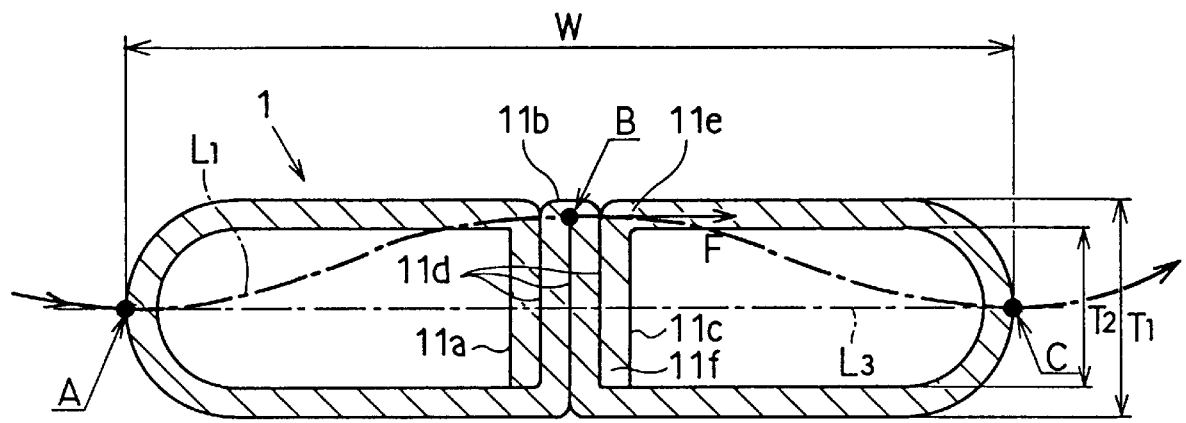
FIG. 1 is lateral cross-sectional view of a flat tube, showing a locus of a blade tip of a blade portion when the tube is cut according to a method of a first preferred embodiment of the present invention.

A flat tube 1 shown in FIG. 1 is typically used in a heater core of an air conditioning apparatus for a vehicle. The flat tube 1 is formed by folding a plate made of an aluminum core material in which a brazing material is clad at both side surfaces of the aluminum core material. The brazing material (i.e., A4045, in the first embodiment) has a melting point lower than the aluminum core material. In the first embodiment, a step for cutting the flat tube 1 is performed before a brazing step.

As shown in FIG. 1, the flat tube 1 has folded protrusion portions (i.e., inner walls) 11a–11c. The protrusion portions 11a–11c are formed approximately at a center portion in a width direction (i.e., major diameter direction) of the flat tube 1 to protrude from flat surfaces of the flat tube 1. Further, the protrusion portions 11a–11c have surfaces parallel with a height direction (i.e., minor diameter direction) of the flat tube 1, and adjacent pairs of the surfaces of the protrusion portions 11a–11c contact to form a laminated structure in the width direction (hereinafter, the contacting surfaces of the protrusion portions are referred to as "overlapped portions"). In the flat tube 1 of the first embodiment, the width dimension W is 27 mm, the thickness dimension $T_1$ is 1.4 mm, a thickness of the plate is 0.25 mm, and a length $T_2$ of each overlapped portion is 0.9 mm.

Figure 2:
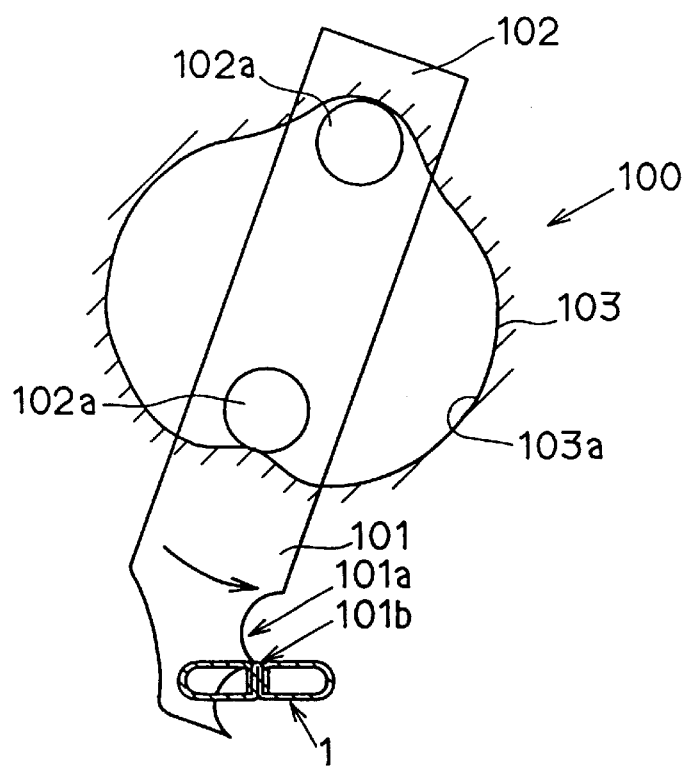
FIG. 2 is a schematic diagram of a cutting device, showing a method for cutting a flat tube according to the first embodiment.

As shown in FIG. 2, a cutting device 100 (i.e., a shearing machine) includes a cutter 101 having a blade portion 101a for cutting the flat tube 1, a holding portion 102 for holding the cutter 101, and a cam 103 having a cam surface 103a. The holding portion 102 has cylindrical protrusion portions 102a and is disposed in the cam 103.

The protrusion portions 102a of the holding portion 102 move while contacting the cam surface 103a of the cam 103. In FIG. 1, a locus $L_1$ is obtained by connecting each point where a blade tip 101b of the blade portion 101a is firstly introduced into the tube in the cutting direction. In the first embodiment, a cam mechanism is constituted so that the locus $L_1$ of the blade tip 101b of the blade portion 101a passes through point B in FIG. 1. As shown in FIG. 2, the blade portion 101a has a semicircular groove portion for facilitating a discharge of cut scrap so that cutting performance of the cutting device 100 is improved.

Next, characteristics of the first embodiment will be described with reference to FIG. 1.

As described above, since the locus $L_1$ of the blade tip 101b of the blade portion 101a passes through the point B, the locus $L_1$ of the blade tip 101b passes through an area proximate to a base portion 11e of a protrusion portion 11c at the rightmost side in FIG. 1 (i,e., the frontmost side protrusion portion in the cutting direction). That is, the locus $L_1$ does not pass through an area proximate to an end portion 11f (i.e., an end of the plate) of the protrusion portion 11c.

Thus, when a bending moment applied to the base portion 11e of the protrusion portion 11c of the flat tube 1 due to the cutting force F of the cutter 101 is considered, a bending center due to the bending moment approximately corresponds to a point of application of the cutting force F. Therefore, a bending moment applied to the protrusion portion 11c becomes small, and the protrusion portion 11c is hardly bent and deformed. Thus, the flat tube 1 is precisely cut to prevent defective cutting.

Further, a direction of the cutting force F corresponds to a tangential direction of the locus $L_1$ of the blade tip 101b of the blade portion 101a. At the B point, the direction of the cutting force F is toward the right side in FIG. 1 from the B point.

In the first embodiment, the locus $L_1$ of the blade tip 101b of the blade portion 101a passes through the base portion 11e of the protrusion portion 11c so that the deformation of the protrusion portion 11c becomes small. That is, it means that the locus $L_1$ passes through a position of the protrusion portion 11c, where bending rigidity of the protrusion portion 11c due to the cutting force F becomes high.

At the A and C points of the flat tube 1 in FIG. 1, the bending rigidity due to the cutting force F becomes highest except at the protrusion portions 11a–11c. In the first embodiment, the locus $L_1$ passing through the A, B and C points has approximately an arcuate shape. The A and C points are intersection points between a visible outline of the flat tube 1 and a center line $L_3$ described later.

When the length $T_2$ of each overlapped portion 11d becomes larger, the bending moment due to the cutting force F becomes larger. Therefore, the defective cutting is readily caused as the length $T_2$ of each overlapped portion is increased. The inventors have studied a relationship between the length $T_2$ of each overlapped portion 11d and the thickness t of the protrusion portion 11c (i.e., thickness of the plate). As a result, if the length $T_2$ of each overlapped portion 11d is more than three times of the thickness t of the protrusion portion 11c, the defective cutting is readily caused. Thus, when the first embodiment of the present invention is applied to a flat tube where the length $T_2$ of each overlapped portion 11d is more than three times of the thickness t of the protrusion portion 11c, the effect of the present invention is particularly effective.

A second embodiment of the present invention will be described with reference to FIGS. 3 and 4. In the first embodiment, a shearing machine is used as the cutting device 100. However, in the second embodiment, a metal sawing machine is used as a cutting device 200.

In the second embodiment, the cutting device 200 includes a circular sawing blade 201 having multiple teeth. Similarly to the locus $L_1$ in the first embodiment, a locus $L_2$ in FIG. 4 is obtained by connecting each point where a tooth of the blade portion 201 is firstly introduced into the flat tube 1 in a cutting direction.

Figure 3:
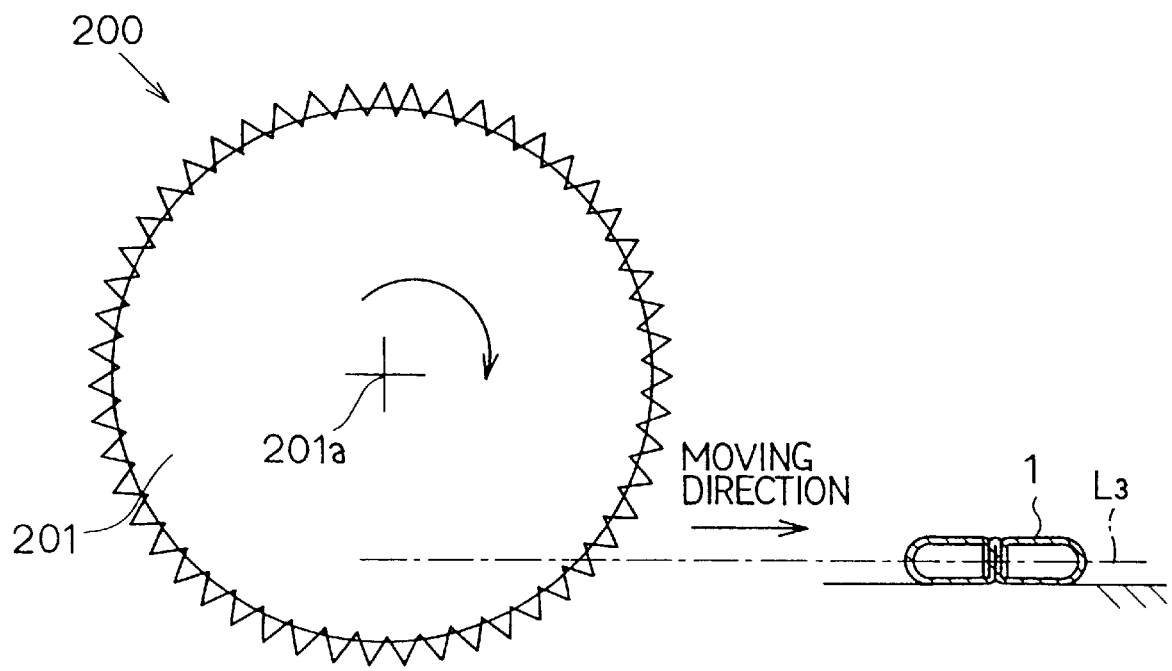
FIG. 3 is a schematic diagram of a cutting device, showing a method for cutting a flat tube according to a second preferred embodiment of the present invention.

As shown in FIG. 3, a rotational center 201a of the sawing blade 201 is at an upper side of the base portion 11e. Therefore, the first cut points (i.e., the locus $L_2$) of the tip portions of the sawing blade 201 relative to the flat tube 1 passes approximately at the base portion 11e of the protrusion portion 11c. The center line $L_3$ of the flat tube 1 passes through a center of the flat tube 1 and is parallel to the cutting direction.

Further, in the second embodiment, the locus $L_2$ is parallel to the center line $L_3$, and does not pass through the A and C points. In the cutting machine 200, a cutting force F is smaller than that of the cutting device 100 in the first embodiment, and a deformation due to cutting the A and C points is hardly caused.

Although the present invention has been fully described in connection with preferred embodiments thereof with reference o the accompanying drawings, it is to be noted that various changes and modifications will become apparent to those skilled in the art.

Figure 4:
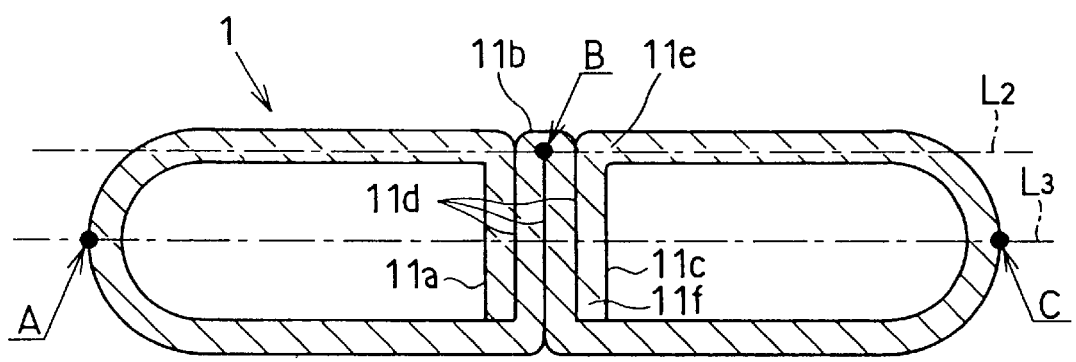
FIG. 4 is a lateral cross-sectional view of a flat tube, showing a locus of a blade tip of a blade portion when the tube is cut according to a method of the second embodiment.
Figure 5:
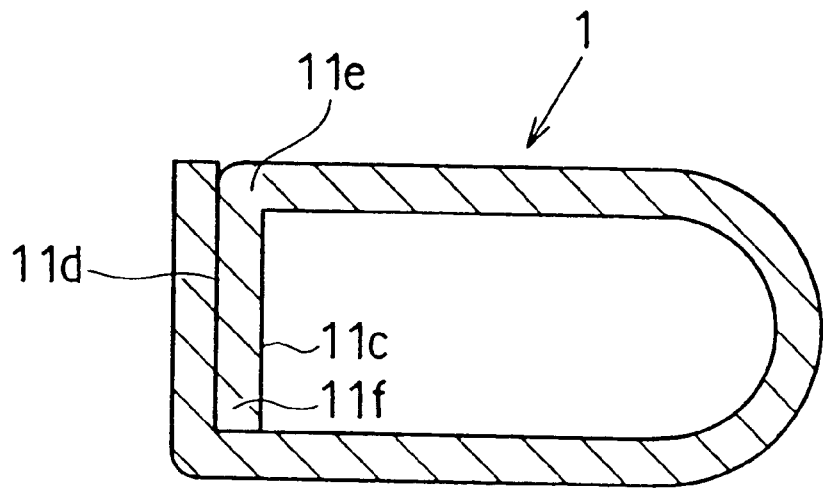
FIG. 5 is a lateral cross-sectional view of a flat tube according to a modification of the present invention.
Figure 6:
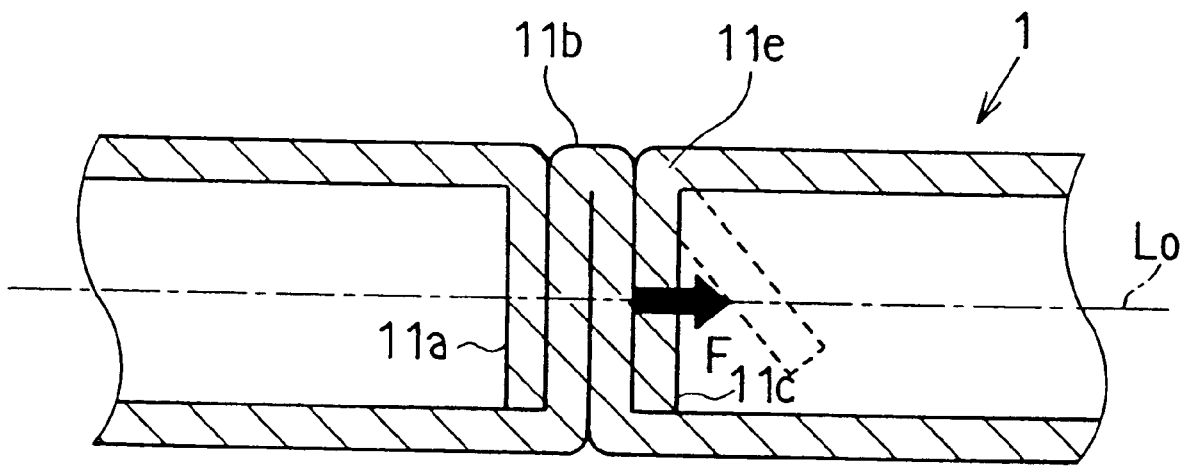
FIG. 6 is a partial lateral cross-sectional view of a flat tube showing a locus of a blade tip of a blade portion and a defective cutting when the tube is cut according to a conventional method.

For example, the cutting method of the present invention is not limited to cutting the flat tube 1 shown in FIGS. 1 and 4, but can be used for cutting a flat tube, for example, shown in FIG. 5. That is, the cutting method of the present invention may be applied for cutting a flat tube where an overlapped portion 11d overlapped in a direction perpendicular to a longitudinal direction of the tube is formed as shown in FIG. 5.

Such changes and modifications are to be understood as being within the scope of the present invention as defined by the appended claims.

What is claimed is:

1. A method for cutting a flat tube having first and second flat surfaces, which is formed by folding a plate to have a plurality of protrusion portions protruding from the first and second flat surfaces to an inside thereof, said protrusion portions having base portions from which the protrusion portions protrude on the first and second flat surfaces, the protrusion portions being overlapped in a major-diameter direction of the flat tube to form overlapped portions, said method comprising:

a driving cutting device having a blade portion, and moving said cutting device relative to the flat tube; and cutting the flat tube with the blade portion in a cutting direction corresponding to the overlapped direct on in such a manner that a locus connecting each point where a blade tip of said blade portion contacts the flat tube in the cutting direction passes through a position proximate to said base portions at a side in the cutting direction, the locus being form by connecting a first moving point of the blade tip in the flat tube in the cutting direction.

2. The method according to claim 1, wherein the locus passes through both ends of the flat tube in the major-diameter direction.

3. The method according to claim 1, wherein the locus passes through one of the first and second flat surfaces, having the base portion at the frontmost side in the cutting direction.

* * * * *